D. J. Marvin.
Harvester.
No 2809
Reissued Dec. 3, 1867.
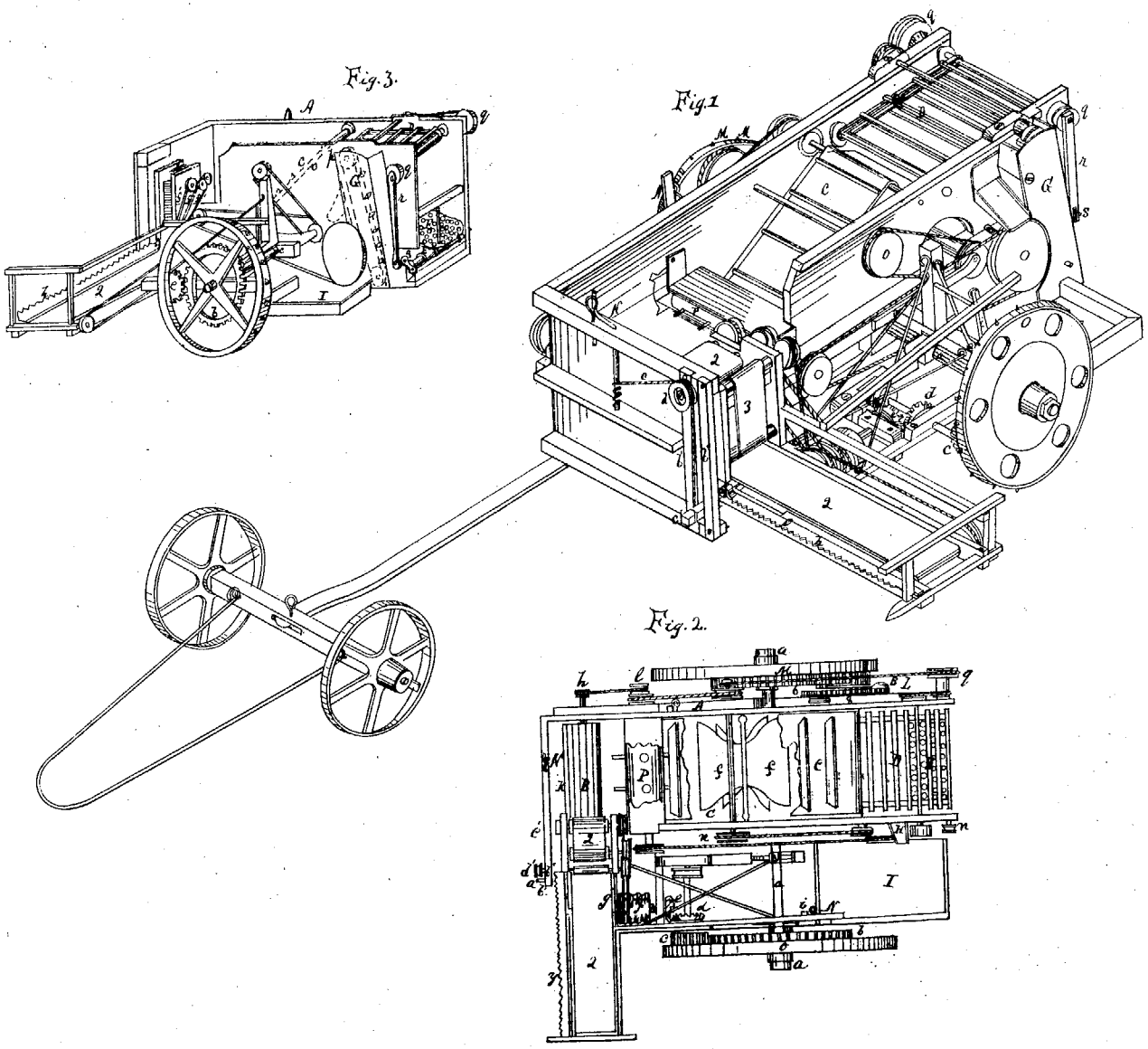
Witnesses.
Chas. A. Pettit
J. H. Webster
Inventor.
David J. Marvin
by Munn & Co
Attorneys.

UNITED STATES PATENT OFFICE.

DAVID J. MARVIN, OF STOCKTON, CALIFORNIA.

IMPROVEMENT IN HARVESTING-MACHINES.

Specification forming part of Letters Patent No. 45,061, dated November 15, 1864; Reissue No. 2,809, dated December 3, 1867.

*To all whom it may concern:*

Be it known that I, DAVID J. MARVIN, of the city of Stockton, in the county of San Joaquin and State of California, have invented, made, used, and constructed an Improved Machine entitled "Marvin's Improved Combined Header and Thrasher;" and I do hereby declare that the following is a full, clear, and exact description of its construction and operation, reference being had to the accompanying drawings and the letters of reference marked thereon, and making part of this specification, in which—

Figure 1 is a perspective view taken from the left-hand front corner. Fig. 2 is a perspective view taken from the left-hand rear corner, and Fig. 3 is a plan or top view.

The nature of my invention is designed to facilitate and expedite the reaping, thrashing, cleaning, and gathering of grain by means of the combination of the several parts and devices hereinafter described.

To enable others skilled in the art to make and use my invention, I will now proceed to describe its construction and operation.

I construct a main frame of wood, or other suitable material, as represented in Figs. 1 and 2, of the desired size and capacity. About midway of the length, and near the bottom thereof, I provide journals for the axle *a*, to which are fitted the power-wheels M and O. The left wheel, O, is placed at some distance from the main frame, for the purpose of attaching a swinging apparatus for the header, which is pivoted on the shaft *a* and arranged as hereinafter described. I provide or cast as a whole to the wheel O the geared wheel *b*, connecting with the pinion *c*, the shaft of which crosses the swinging frame, and is held thereon in journal-boxes. To this shaft I fit a beveled-gear wheel, *d*, Fig. 3, which connects with the beveled pinion *e*, running on a shaft, *n*, between the swinging bars. Upon the same shaft is fitted a pulley, *f*, for four belts, *f′ f′*, which communicate with the small pulleys belonging to the main belts or endless aprons 2 and 3. The end of this shaft *n* is made with an arm or crank, to which is fitted the pitman *g*, which may be attached in any convenient manner to the sickle-plate *h* at the right end, imparting to the same a rapid and oscillating motion.

The header apparatus may be thrown in and out of gear by the lever 1, which rests against a pin to the sliding lever *i*. The former is attached on its lower end to the journals of the swinging apparatus. Over said journals I fit iron frame-bars, which are bent to such angles that their forward ends may be fastened underneath the back end of the frame-bars of the swinging apparatus. The back end of said bars is bent or forged at a right angle laterally, so that the same may fit into the orifice provided in the sliding lever *i*. Thus sufficient space is obtained between the swinging journals and the forward angles of the iron bars to allow the pinion *c* to be removed from the geared wheel *b*. Said iron bars may be held in rings, clamps, or other device which will allow the same to slide. One lever, *i*, is however, sufficient for moving the swinging apparatus. The header is provided with a frame similar to the one represented in the drawings, Figs. 1 and 2, at the left end of which may be seen the cylinder and pulley, over which the belt or apron 2 passes, the width of which may vary according to the nature and size of the machine. Said belt extends inward and toward the main frame of the thrasher, whence its progress is arrested by a cylinder, passing underneath which it rises perpendicularly a short distance above the feeder B, passing or revolving over two cylinders, which are provided with small pulleys connected by belts to the pulley *f*, as is also the small pulley to the left of the header. I provide a small endless belt, 3, of the same width as that of 2, which, it will be seen, is placed in the angle occasioned by the belt 2 going from a horizontal to a perpendicular direction, said belt 3 running parallel with the perpendicular portion of belt 2, but a trifle of space being left between the belts 2 and 3, so as to admit of the stalks of grain being elevated between the belts 2 and 3. The inside bar or sleeper, *a′*, of the swinging apparatus projects a trifle through between the posts *b′ b′* of the frame. To this end I attach a chain or rope, *c′*, which I allow to pass over the pulley *d′*, located over said slot in the cross-timber, thence to the rod N, around which it is wound, and which serves as a means for further regulating the header. It would be obvious to say that this header is a separate implement, since it works entirely independent of the thrasher, yet its motive power is derived from the same source propelling the thrasher. The driver stands on the platform K.

In Fig. 2 may be observed the entire machine, with the truck attached.

I construct a cylindrical feeder, B, with flutings running lengthwise, the shaft of which, extending outside of the frame, is provided with a pulley, *k*. Immediately under said cylinder I provide an inclined board, the upper edge of which reaches nearly to the under side of said cylinder. This, with the inclined plane *o*, which I shall hereinafter describe, forms a trough, into which I fit the thrashing-cylinder P, which is of about the same dimensions as the feeder B, and is provided with a quantity of wire projections, as represented in the drawings. The grain, passing thus between the feeder B and the cylinder P, undergoes the process of separating the kernels from the ears or stalks. The grain is then conveyed upward and dropped on the inclined plane *p* by the endless belt C. The straw is carried in the same manner to the slot-belt D. The cylinder P is provided with a double pulley, *l*, on the right end, and a single pulley on the left end of the shaft thereof, the pulley of the left end connecting by belt with the large pulley *m*, which latter is fastened to the shaft of the pinion L. Said pinion connects with the geared wheels Q and R, situated on the cylinder belonging to the fan S, the wheels Q and R communicating with the geared wheel *b'*, attached to the power or driving wheel M. The fan S is situated under the inclined planes *o p*, and before the shaking-screen E, which serves to cleanse the grain from foreign substances. The left end of the fan-shaft is provided with a pulley, which communicates by belt with the pulley *n*, the shaft of which crosses the main frame near the upper extremity of belt C, to which I affix a double pulley, which connects by belt with the double pulley of the rack P.

It will be observed that many of the parts revolving are provided with double belting and pulleys, for a safeguard in case of the breaking or slipping of any of the belts.

The inclined planes mentioned as being situated under the belt C are indicated by the dotted lines *o* and *p*, which form a space for the fan S. The inclined plane *p* receives the grain from the cups of elevator C, thence dropping it upon the shaking-screen E. The belt C is placed parallel with the inclined plane *o*. The upper cylinder-shaft, at the right end, is provided with a pulley, which communicates by belt with the pulley and shaft *q*, which answers at the same time as a roller for the slot-belt D. To the left end of said shaft *q*, I attach an eccentric pulley, to which is attached the rod *r*, the lower end of which is held by a slot and pin to the arm *s*, which latter is held by a pin against the lower end of the frame, the other end of which is attached to the shaking-screen E.

I construct an elevator, G, to the left of the frame, as represented in the drawings, the upper pulley-shaft of which crosses the frame, and is provided with a pulley connecting by belt with the pulley and shaft *q*, from which latter the elevator G receives its motion. The lower pulley of said elevator serves as the shaft for the spiral conveyer F, which is situated immediately under the shaking-screen E in the lower frame, conveying the grain that has fallen through the screen and been cleaned by the fan to the cups of the elevator, which drop it upon the trough H, where it may be gathered into sacks or otherwise. Under said trough may be seen a platform, I, whereon the person tending the collection of the grain is placed.

The thrasher may be thrown in and out of gear by the lever A, which rests against a pin in the main frame, and the lower end of which is fastened by a pivot to the lower frame-timber. A short distance above this pivot is an orifice for the reception of the brake *t*, which may be attached to the axle-tree *a* in any manner. The journal-box holding the axle *a* and main wheel M is elongated laterally, and thus allows the pinion R to be removed from the geared wheel *b'*, when all the parts belonging to the thrasher will cease working.

The grain, after reaping, is conveyed by belt 2, thence passes perpendicularly upward between the belts 2 and 3, thence falls on the feeder B, which conveys it to the drum P, which moves with sufficient rapidity to thrash the same. The straw and grain pass over the conveyer C simultaneously. I also construct a truck, as represented in Fig. 2, which may be attached in any known manner.

Having thus described my invention, what I claim as new, and desire to secure by Letters Patent, is the following, viz.:

1. In a combined header and thrasher, so pivoting or hinging the cutter-frame upon the main axle *a* as it can be moved longitudinally, and also raised or lowered at pleasure, substantially as and for the purpose specified.

2. In a combined header and thrasher having its cutter-frame mounted or hinged as above described, the combination and arrangement of the bar *a'*, posts *b' b'*, pulley *d'*, cord *c'*, and crank-rod N, substantially as and for the purpose herein set forth.

3. The arrangement of the sickle-plate *h*, aprons 2 and 3, corrugated feed-roller B, thrashing-cylinder P, fan S, inclines *o p*, straw-carrier D, screen E, conveyer F, and elevator G, substantially as described.

4. In a combined heading and thrashing machine, as above described, the arrangement of the lever A, swinging axle *a*, and gear-wheels *b'* Q, for the purpose of throwing the thrashing and cleaning mechanism into or out of gear, substantially in the manner specified.

The above specification of my invention signed by me this 6th day of May, 1865.

Witnesses: DAVID J. MARVIN.

B. P. BAIRD,

T. P. HEATH.